(12) United States Patent
Ohashi (10) Patent No.: US 11,341,276 B2
(45) Date of Patent: May 24, 2022

(54) INFORMATION PROCESSING APPARATUS AND INFORMATION PROCESSING METHOD

(71) Applicant: KOEI TECMO GAMES CO., LTD., Kanagawa (JP)

(72) Inventor: Ryunosuke Ohashi, Kanagawa (JP)

(73) Assignee: KOEI TECMO GAMES CO., LTD., Kanagawa (JP)

( * ) Notice: Subject to any disclaimer, the term of this patent is extended or adjusted under 35 U.S.C. 154(b) by 300 days.

(21) Appl. No.: 16/752,823

(22) Filed: Jan. 27, 2020

(65) Prior Publication Data

US 2020/0265152 A1   Aug. 20, 2020

(30) Foreign Application Priority Data

Feb. 14, 2019   (JP) .............................. JP2019-024348

(51) Int. Cl.
*G06F 21/62*   (2013.01)
*A63F 13/73*   (2014.01)

(52) U.S. Cl.
CPC ............ *G06F 21/629* (2013.01); *A63F 13/73* (2014.09); *A63F 2300/552* (2013.01); *G06F 2221/2137* (2013.01)

(58) Field of Classification Search
CPC ........... G06F 21/629; G06F 2221/2137; A63F 13/69; A63F 13/73; A63F 13/75; A63F 13/79; H04L 63/10–102; H04L 63/107–108
See application file for complete search history.

(56) References Cited

U.S. PATENT DOCUMENTS

| | | | |
|---|---|---|---|
| 5,203,848 A * | 4/1993 | Wang ..................... | A63F 13/02 463/45 |
| 6,722,984 B1 * | 4/2004 | Sweeney, Jr. ........... | A63F 13/06 341/176 |
| 2009/0102616 A1 * | 4/2009 | Stone ..................... | A63F 13/75 340/309.9 |

FOREIGN PATENT DOCUMENTS

JP   2016-120134   7/2016

* cited by examiner

*Primary Examiner* — Minh Dinh
(74) *Attorney, Agent, or Firm* — IPUSA, PLLC (57) ABSTRACT

There is provision of an information processing apparatus configured to cause a user having a user account to use functions on the user account. The information processing apparatus is configured to receive an instruction from the user to restrict use of the functions on the user account, to restrict the use of the functions on the user account in response to the receiving of the instruction, and to perform information processing for granting benefit to the user in accordance with a period of time when the use of the functions is restricted.

10 Claims, 11 Drawing Sheets

| ID | PASSWORD | FUNCTION RESTRICTING FLAG | FUNCTION RESTRICTION INFORMATION | ... |
|---|---|---|---|---|
| player01 | aaa | on | Restricted until 7/31/2019 | ... |
| player02 | bbb | off | | ... |
| player03 | ccc | off | | ... |
| player04 | ddd | on | Within one hour per day | ... |
| ... | ... | ... | ... | ... |

FIG.7

| ID | PASSWORD | RESTRICTED FUNCTION | FUNCTION RESTRICTION INFORMATION | ... |
|---|---|---|---|---|
| player01 | aaa | All | Restricted until 7/31/2019 | ... |
| player02 | bbb | None | | ... |
| player03 | ccc | Function B | Restricted until 7/31/2019 | ... |
| player04 | ddd | Function A | Within one hour per day | ... |
| ... | ... | ... | ... | ... |

Use of functions is restricted on your account until 7/31/2019.

Back

INFORMATION PROCESSING APPARATUS AND INFORMATION PROCESSING METHOD

CROSS REFERENCE TO RELATED APPLICATIONS

This application is based on and claims priority to Japanese Patent Application No. 2019-024348, filed Feb. 14, 2019, the entire contents of which are incorporated herein by reference.

BACKGROUND OF THE INVENTION

1. Field of the Invention

The present disclosure relates to an information processing apparatus, and an information processing method.

2. Description of the Related Art

Traditionally, in order to provide a healthy game environment suitable for an actual age of a user participating in a social-network game, when the estimated age of the user is less than a predetermined age, the functions executable in the social-network game may be limited by an operation from a terminal (see, for example, Patent Document 1).

For example, a player who favors a computer game may play the computer game if there is an environment in which the player can play the computer game, even in a case in which the player needs to concentrate on study for an exam or the like. For such a player, if a function that allows it to limit its own game play is provided, it would be useful. It should be noted that the mechanism described in Patent Document 1 is not such that the player is able to restrict the game play by himself/herself.

On the other hand, a function that the player can restrict his/her game play by himself/herself is likely to be a factor for the player's withdrawal from the computer game. For this reason, a mechanism is required in which the player whose limitation of game play has been canceled (lifted) can easily return to the game.

The present disclosure is intended to provide a new mechanism to restrict the player's use of functions while avoiding decrease in the player's continuation rate.

RELATED ART DOCUMENT

Patent Document

[Patent Document 1] Japanese Patent No. 5821110

SUMMARY OF THE INVENTION

According to one aspect of the present disclosure, an information processing apparatus configured to cause a user having a user account to use functions on the user account is provided. The information processing apparatus is configured to receive an instruction from the user to restrict use of the functions on the user account, to restrict the use of the functions on the user account in response to the receiving of the instruction, and to perform information processing for granting benefit to the user in accordance with a period of time when the use of the functions is restricted.

DETAILED DESCRIPTION OF EMBODIMENTS

Hereinafter, embodiments for carrying out the present disclosure will be described with reference to the drawings. The present embodiments describe examples of restricting a user (player) having a user account to use a function of a computer game on the user's account (user account). However, application of the present disclosure is not limited to a computer game. For example, the present disclosure can also be applied to restriction of use of functions on a user account of a social networking service (SNS).

[Game System]

Figure 1:
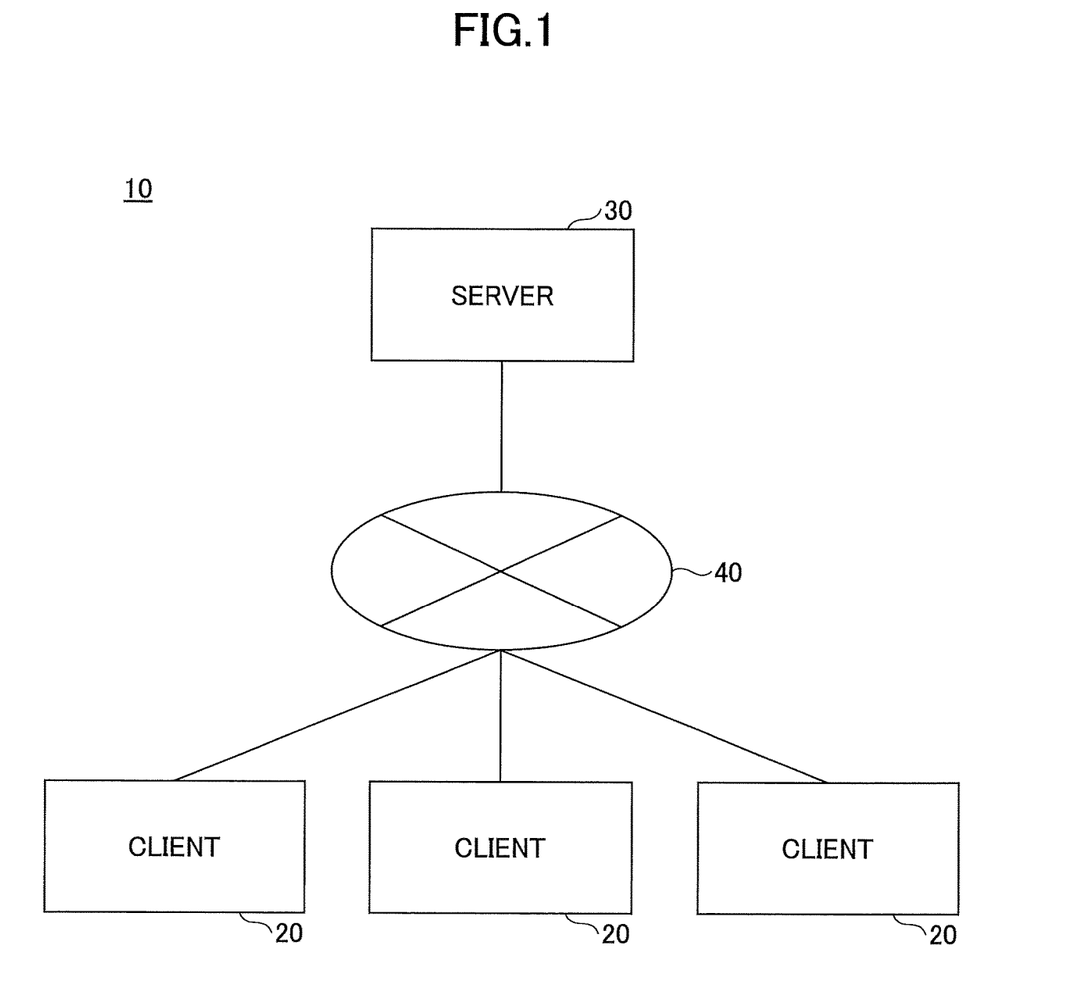
FIG. 1 is a diagram illustrating an example of a game system according to an embodiment.

First, a game system 10 according to an embodiment will be described with reference to FIG. 1. The game system 10 according to the present embodiment is configured such that a client 20 and a server 30 are communicatively connected via a network 40.

The client 20 is an example of an information processing apparatus in which a user (may also be referred to as a "player") plays a computer game (may also be referred to as a "game"). Examples of the information processing apparatus include a cellular phone such as a smartphone, a handheld game console, a personal computer, a tablet computer, a home video game console, and an arcade machine. The client 20 receives, from a player, operations with a touch panel, a controller, a mouse, a keyboard, or the like, to cause the player to play the game. It should be noted that the number of the clients 20 is not limited to three as illustrated in FIG. 1, and may be other than three.

The server 30 is an example of an information processing apparatus that provides functions necessary for the game to the client 20 by transmitting and receiving data to and from the client 20. The server 30 may be implemented by a cloud computer. The number of the server 30 illustrated in FIG. 1 is not limited to one, but may be distributed by two or more servers.

For example, the server 30 is used for letting the client 20 download a computer game program (application), for providing a login function for players, for managing information about players and game scores, for restricting a player to use a function on a player's user account, and for granting benefit to a player in the game in accordance with a period during which the use of the function was restricted. Note that, in the present specification, a function on a user account means a function that a user having the user account can use when the user is logged in to the user account.

Figure 2:
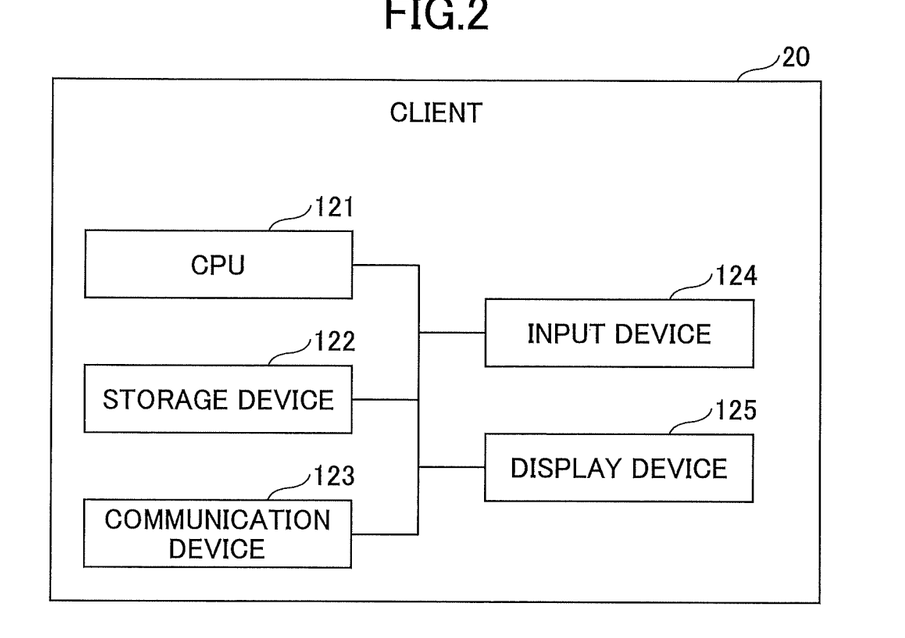
FIG. 2 illustrates an example of a hardware configuration of a client according to the embodiment.

FIG. 2 is a diagram illustrating an example of a hardware configuration of the client 20. The client 20 includes a CPU 121, a storage device 122, a communication device 123, an input device 124, and a display device 125. The CPU 121 controls the client 20. The storage device 122 may be, for example, a memory such as a ROM (Read Only Memory) or a RAM (Random Access Memory), or a storage device such as an HDD (Hard Disk Drive) or an SSD (Solid State Drive).

The communication device 123 is a communication device such as a network card that controls communication via the network 40. The input device 124 is an input device such as a touchpad, a controller, a mouse, a keyboard, a camera, or microphone. The display device 125 is an output device such as a display or a speaker. By combining a touch pad and a display, a touch panel is realized.

Figure 3:
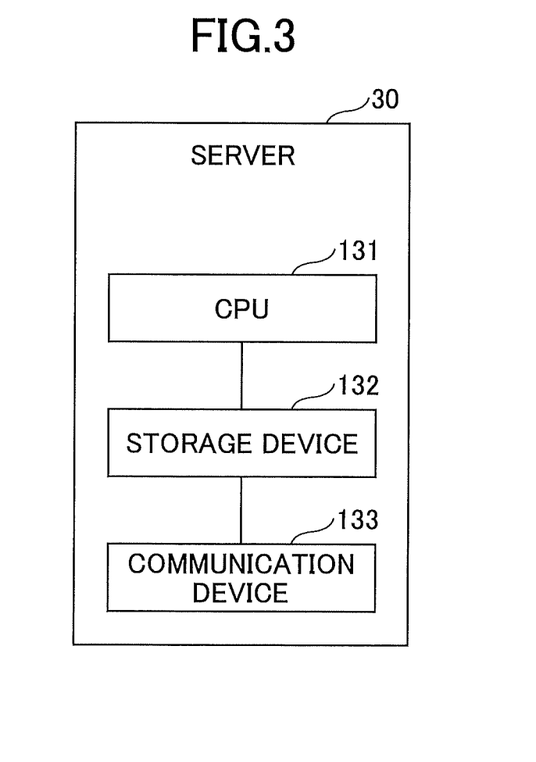
FIG. 3 is a diagram illustrating an example of a hardware configuration of a server according to the embodiment.

FIG. 3 is a diagram illustrating an example of a hardware configuration of the server 30. The server 30 includes a CPU 131, a storage device 132, and a communication device 133. The CPU 131 controls the server 30. The storage device 132 is a memory such as a ROM or a RAM, or a storage device such as an HDD or an SSD. The communication device 133 is a communication device such as a network card that controls communication via the network 40.

Figure 4:
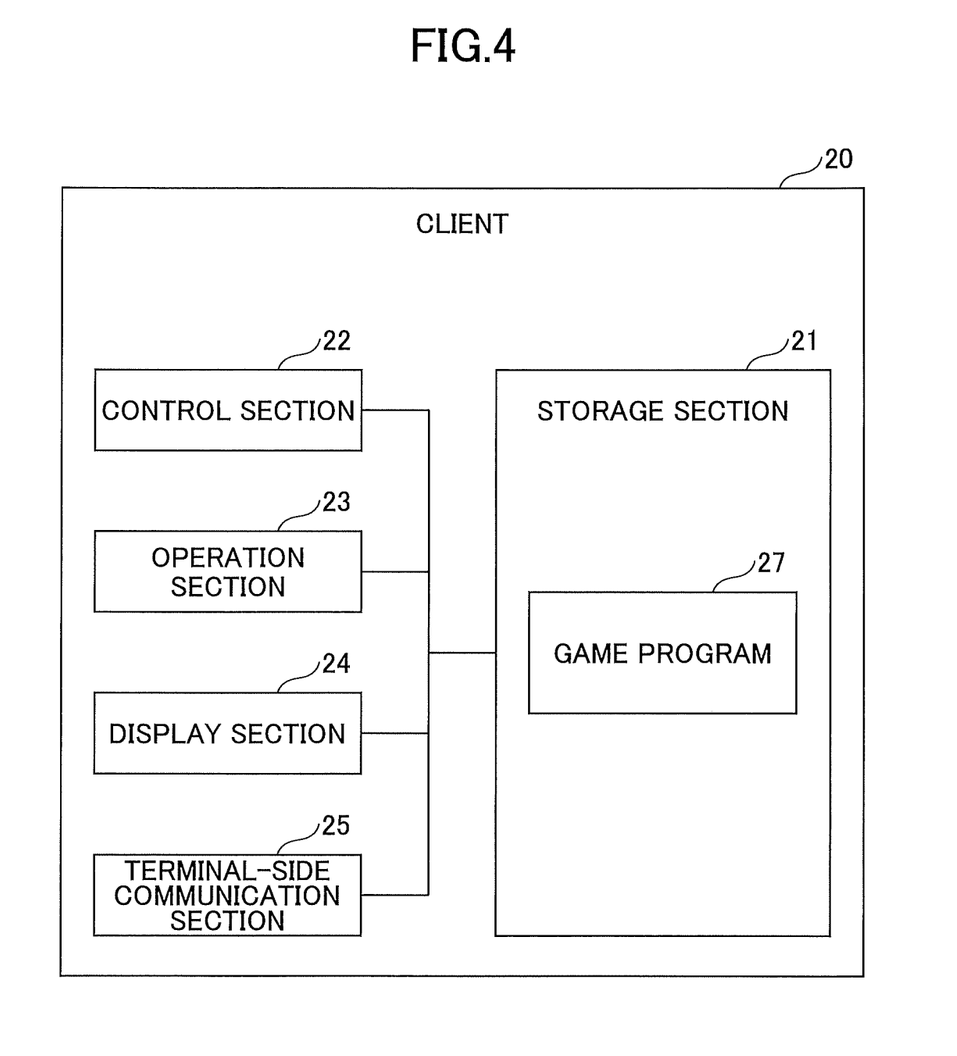
FIG. 4 is a diagram illustrating an example of a functional configuration of the client according to the embodiment.

FIG. 4 is a diagram illustrating an example of a functional configuration of the client 20. The client 20 includes a storage section 21, a control section 22, an operation section 23, a display section 24, and a terminal-side communication section 25. The storage section 21 stores programs (computer programs) such as a game program 27, and data used by the programs. The storage section 21 may be implemented by the storage device 122, or may be implemented by a storage device connected through the network 40.

Referring back to FIG. 4, the control section 22 controls an entirety of the client 20. The control section 22 is realized by the CPU 121 executing processes written in the game program 27. The operation section 23 receives various operations of the input device 124 by a player. The display section 24 displays images of the game on the display device 125. The operation section 23 is realized by the input device 124 being controlled by the CPU 121. The display section 24 is realized by the display device 125 controlled by the CPU 121.

Here, various operations of the input device 124 by a player refer to operations in which the player controls the operation section 23 in order to cause the CPU 121 to execute processes. The operation section 23 receives various operations from the player playing the game. The control section 22 advances the game based on the various operations received from the player. The display section 24 displays images of the game generated by the control section 22. The terminal-side communication section 25 performs communication with the server 30. The terminal-side communication section 25 is realized by the CPU 121 executing the game program 27 to control the communication device 123 in accordance with the game program 27.

Figure 5:
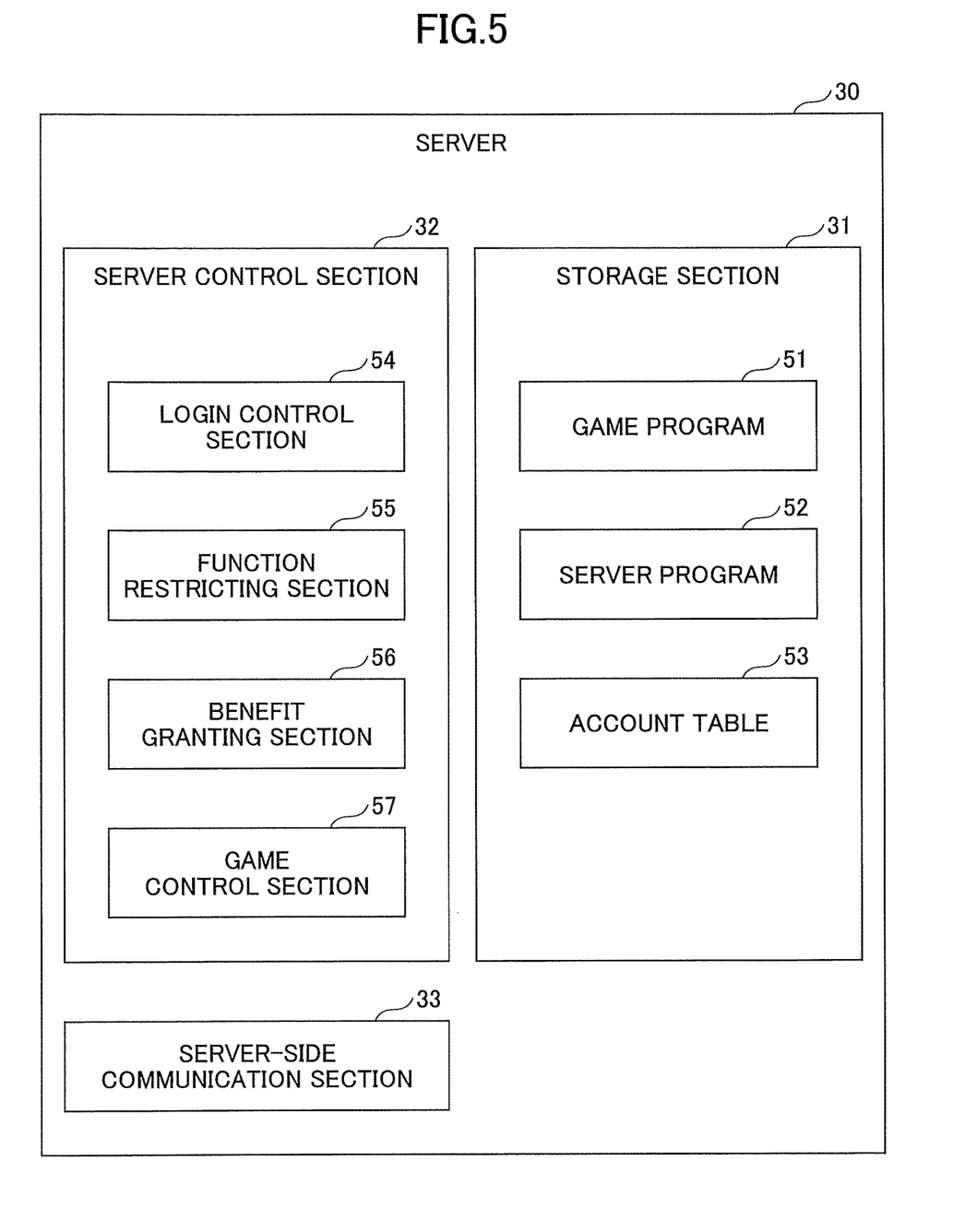
FIG. 5 is a diagram illustrating an example of a functional configuration of the server according to the embodiment.

FIG. 5 is a diagram illustrating an example of a functional configuration of the server 30. The server 30 of FIG. 5 includes a storage section 31, a server control section 32, and a server-side communication section 33. The storage section 31 stores programs such as a game program 51 and a server program 52, data used by the programs, an account table 53 to be described later, and the like. The storage section 31 may be implemented by a storage device 132, or may be implemented by a storage device connected via the network 40.

Referring back to FIG. 5, the server control section 32 performs overall control of the server 30. The server control section 32 is realized by the CPU 131 executing processes written in the server program 52. For example, the server control section 32 performs download processing, which causes the client 20 to download the game program 51 stored in the storage section 31 and data used by the game program 51.

A login control section 54 of the server control section 32 processes a login operation of a player that operates the client 20. A function restricting section 55 performs a function restricting process that restricts use of a part or all functions on a user account of a player (player's account). A benefit granting section 56 performs a benefit granting process for granting benefit to a player in the game in accordance with a period during which the use of the function was restricted. A game control section 57 causes the player to play the game within a range of functions which are not restricted in use.

The server-side communication section 33 communicates with the client 20. The server-side communication section 33 is realized by the CPU 131 executing the server program 52 to control the communication device 133 in accordance with the server program 52.

Figure 6:
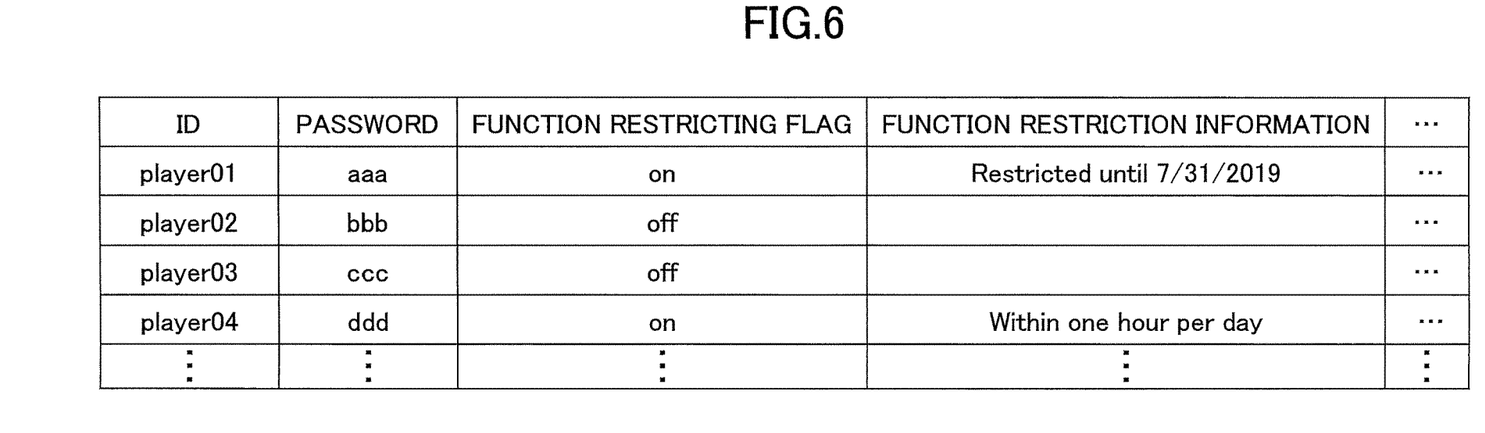
FIG. 6 is an example diagram illustrating an account table.
Figure 7:
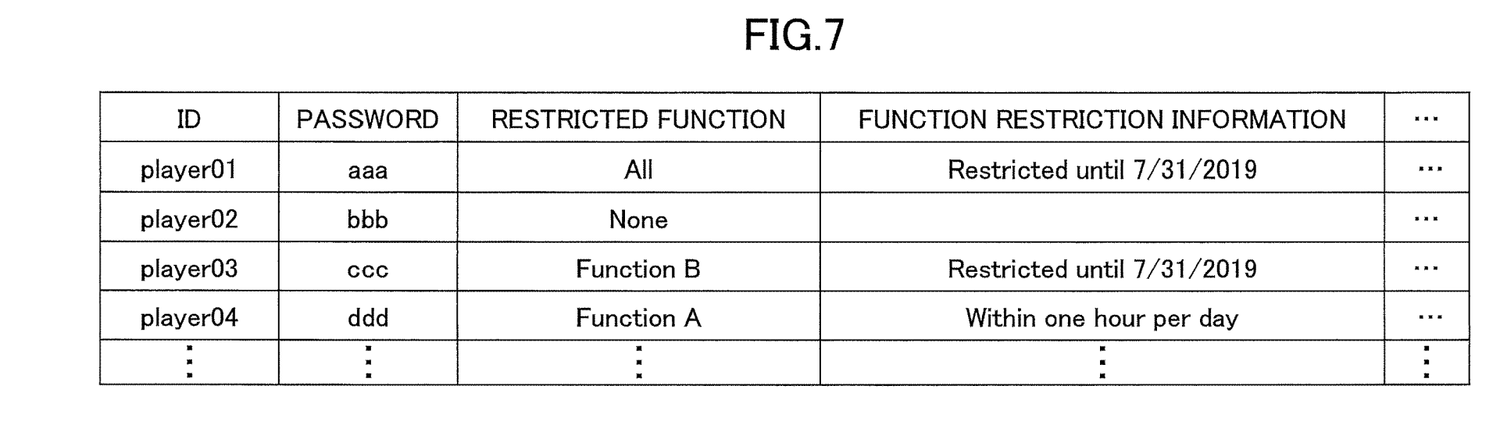
FIG. 7 is a diagram illustrating another example of the account table.

The account table 53 of the server 30 includes account information of a player who operates the client 20 to log in to the server 30. FIG. 6 is a diagram illustrating an example of the account table 53. FIG. 7 is a diagram illustrating another example of the account table 53.

In the game system 10 according to the present embodiment, the account table 53 of FIG. 6, or the account table 53 of FIG. 7 is used for processing a login operation of a player that operates the client 20, and for performing the function restricting process and the benefit granting process for the player who has logged in.

The account table 53 of FIG. 6 includes items of an ID, a password, a function restricting flag, and function restriction information. The ID is an example of identification information for uniquely identifying a player. The password is an example of authentication information. The function restricting flag is information indicating whether or not use of functions on a corresponding player's account is restricted. The function restriction information is information indicating a condition in which function restriction is made by the function restricting process, such as information indicating days or a period during which the function restriction is made.

For example, the account table 53 in FIG. 6 indicates that use of functions is restricted until "Jul./31/2019" with respect to a user account of a player having an ID "player01". The player having the ID "player01" cannot use functions until "Jul./31/2019" which is an expiration date of the function restriction, and the player cannot execute the game.

In addition, the account table 53 in FIG. 6 indicates that use of functions is restricted to a period "within one hour per day" with respect to a user account of a player having an ID "player04". The player having the ID "player04" can use the restricted functions if a time of using the restricted functions is "within one hour per day", and can execute the game.

The account table 53 in FIG. 6 illustrates an example in which the function restriction is applied to all functions usable on a user account. The account table 53 in FIG. 7 illustrates an example in which the function restriction is applied to at least a part of functions usable on a user account.

The account table 53 of FIG. 7 includes items of an ID, a password, a restricted function, and function restriction information. The ID, the password, and the function restriction information are the same as those in the account table 53 of FIG. 6. The restricted function is information indicating one or more functions whose use is restricted by the function restricting process. In a case in which a symbol "All" is stored in the restricted function field, the symbol "All" has the same meaning as the "on" flag stored in the function restricting flag field illustrated in FIG. 6, indicating that all of the functions usable on a corresponding player's account are restricted in use. In a case in which a symbol "None" is stored in the restricted function field, the symbol "None" has the same meaning as the "off" flag in the function restricting flag field illustrated in FIG. 6, indicating that all of the functions usable on a corresponding player's account are in usable states.

For example, in the account table 53 of FIG. 7, "Function B" is stored in the restricted function field of a row of a player having an ID "player03", which indicates that use of a function "Function B" on a user account of the player having the ID "player03" is restricted until "Jul./31/2019". Until an expiration date "Jul./31/2019" of the restriction of use of the function "Function B", the player having the ID "player03" is allowed to execute the game using functions other than "Function B".

In addition, the account table 53 in FIG. 7 indicates that use of a function "Function A" is restricted to a period "within one hour per day" with respect to a user account of a player having an ID "player04". The player having the ID "player04" can execute the game using the function "Function A" under a condition of "within one hour per day". Note that the player having the ID "player04" can execute the game for more than "one hour per day" by using functions other than the function "Function A".

[Process Flow]

Figure 8:
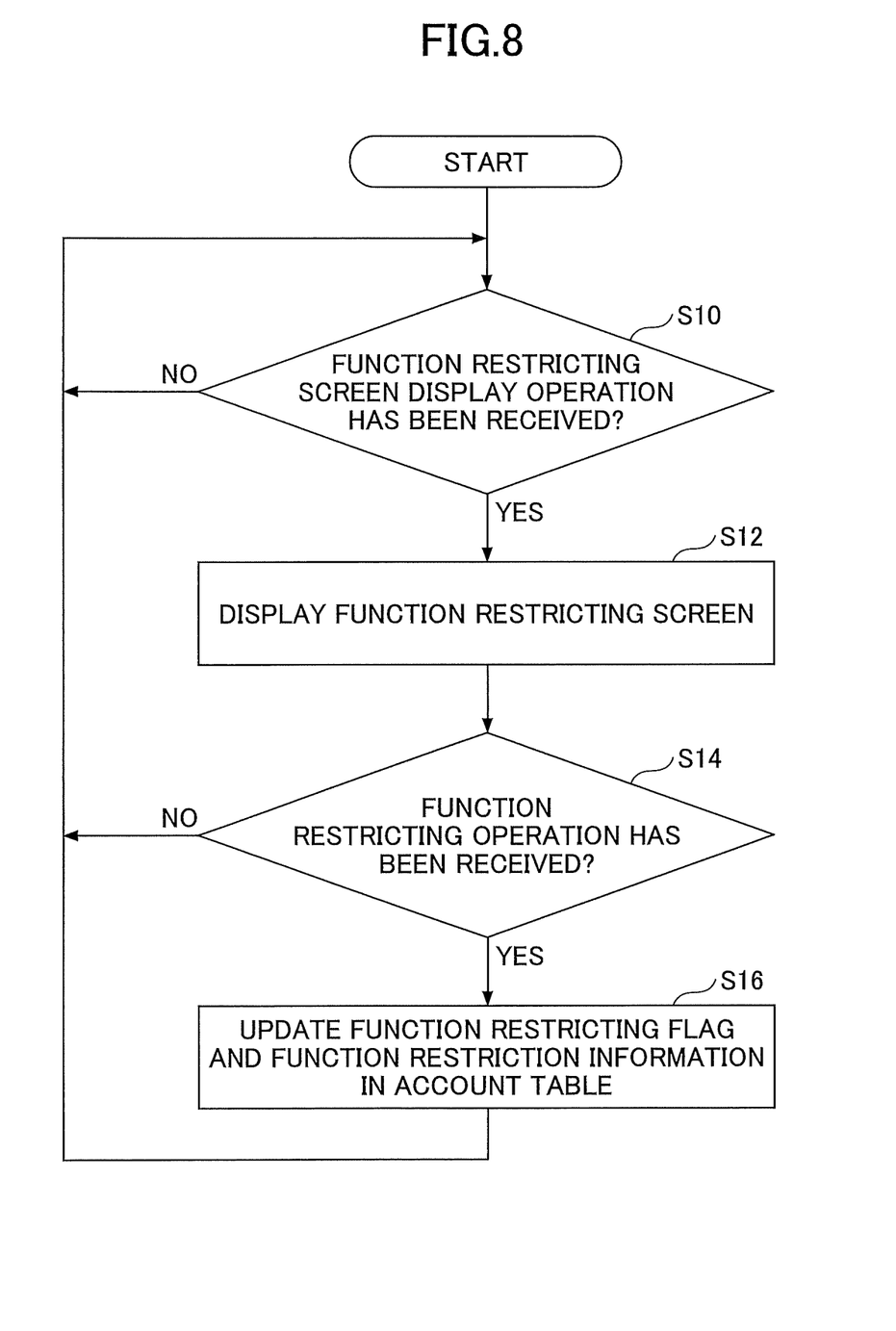
FIG. 8 is a flowchart illustrating an example of a process for restricting a player's use of a function of the game system according to the embodiment.

Next, a process of receiving an operation of restricting use of a function from a player who operates the client 20 to update the account table 53 will be described with reference to FIG. 8. FIG. 8 is a flowchart illustrating an example of a process for restricting use of functions by a user (player) in the game system 10 according to the present embodiment.

In a case in which a player operating the client 20 wishes to restrict use of functions on the player's account of the game for a certain period of time decided by the player (lock the functions of the game based on time, so that the player cannot play the game), the player performs an operation to the client 20 to cause the client 20 to display a function restricting screen.

Figure 9:
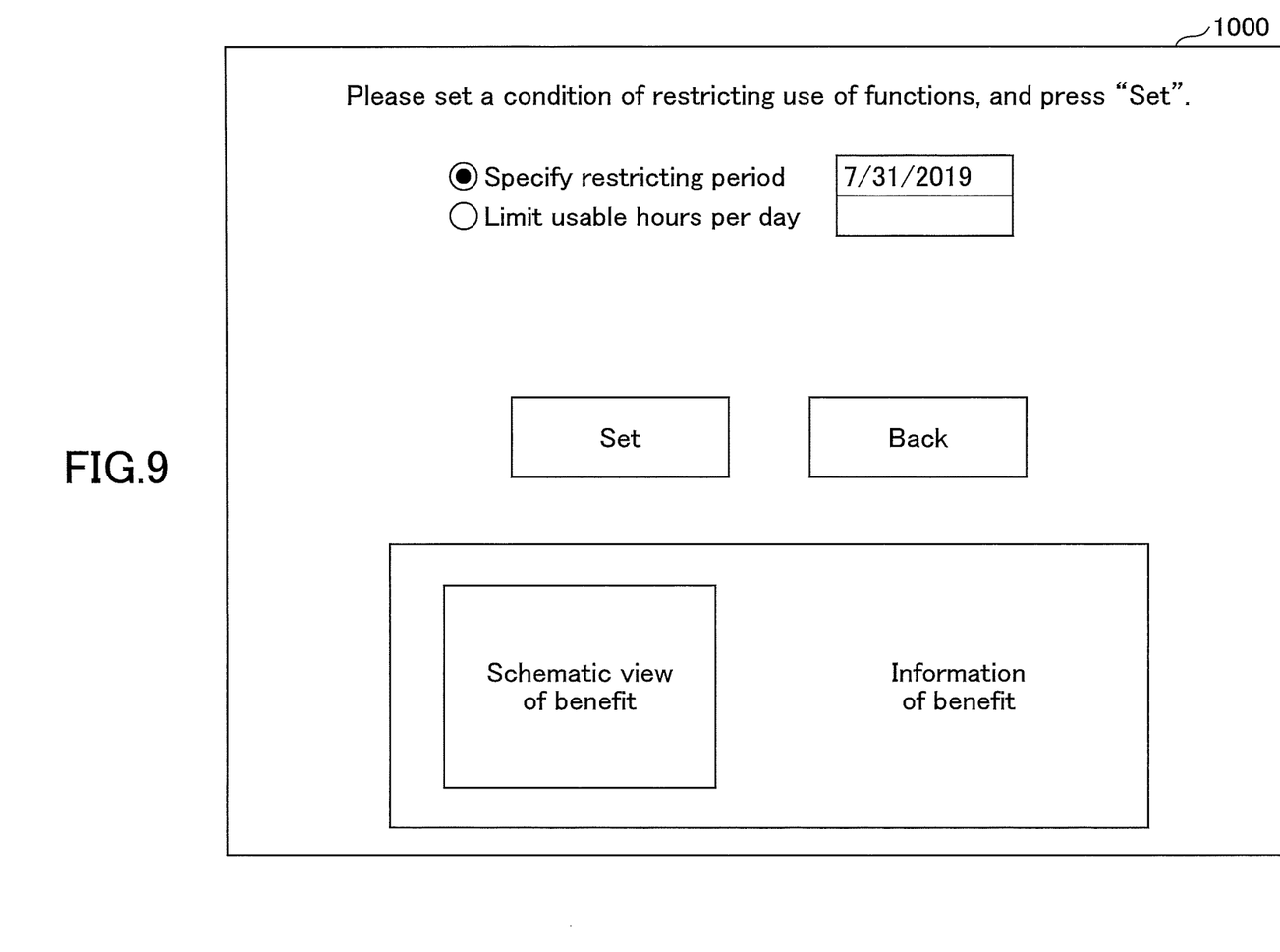
FIG. 9 is a diagram illustrating an example of a function restricting screen according to the embodiment.

If the server 30 receives the operation to display the function restricting screen from the player through the client 20 (YES in S10), the server 30 displays, for example, a function restricting screen 1000 illustrated in FIG. 9 on the client 20 operated by the player (S12).

FIG. 9 is a diagram illustrating an example of the function restricting screen 1000 according to the present embodiment. The account function restricting screen 1000 of FIG. 9 is configured such that a user (player) can select an operation method of restricting use of functions from among an operation of specifying a period of time when the use of the functions is prohibited and an operation of specifying (limiting) usable hours of the functions per day. In a case of selecting the operation of specifying a period of time when the use of the functions is prohibited, a radio button in FIG. 9 labeled "Specify restricting period" may be chosen. In a case of selecting the operation of specifying (limiting) usable hours per day, a radio button labeled "Limit usable hours per day" may be chosen. FIG. 9 illustrates an example in which "Specify restricting period" is chosen by the player and in which "Jul./31/2019" is set as an expiration date of the restriction of the use of the functions.

In addition, when the player performs a setting operation of restricting use of functions by using the function restricting screen 1000, information of benefit granted to a player when the restriction of the use of the function expires, and a schematic view of the benefit are displayed on the function restricting screen 1000 of FIG. 9. Accordingly, the player can recognize the benefit that is granted when the restriction expires and when the player returns to the game. Thus, the player is motivated to return to the game.

When the server 30 receives the operation of restricting the use of the functions from the player through the client 20 (YES in S14), the server 30 updates the function restricting flag and the function restriction information in the account table 53 of FIG. 6, based on contents of the operation of restricting the use of the functions received from the player (S16).

According to the process of the flowchart illustrated in FIG. 8, on the account function restricting screen 1000, the player can restrict using the functions authorized to the player's account of the game for a certain period of time decided by the player (lock the function of the game based on time so that the player cannot play the game). In addition, the game system 10 may be configured such that the restriction of use of the functions on the player's account cannot be canceled, once the player has restricted the use of the functions on the player's account. For example, the game system 10 may be configured not to provide a user interface for receiving an instruction from a player to cancel the restriction that is set by the player.

Figure 10:
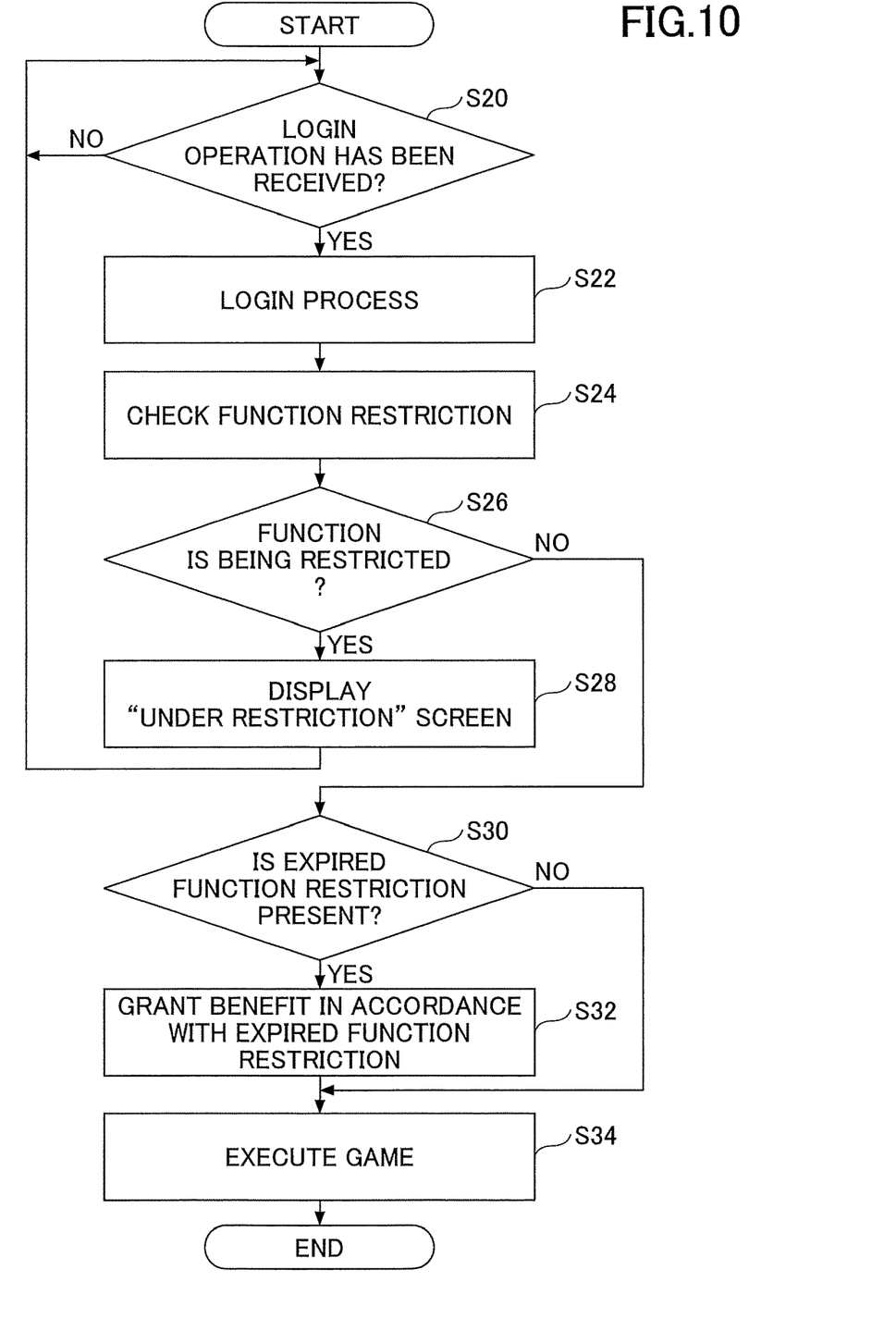
FIG. 10 is a flowchart illustrating an example of a login process of the game system according to the embodiment.

Next, a process performed by the server 30 that received a login operation from a player operating the client 20 will be described with reference to FIG. 10. FIG. 10 is a flowchart illustrating an example of a process for the login operation of the game system 10 according to the present embodiment.

The player who wishes to log in to a game account of the player enters his/her ID and password on a login screen displayed on the client 20 for example, and performs a login operation by clicking a login button or the like. When the server 30 receives the login operation by the player from the client 20 (YES in S20), the server 30 performs a login process of the player who has performed the login operation on the client 20 (S22).

In step S22, if a set of the ID and the password input by the player is in the account table 53 of FIG. 6, the login control section 54 of the server 30 allows the player's login to a user account (player's account) specified with the set of the ID and the password input by the player. If the set of the ID and the password input by the player is not in the account table 53 of FIG. 6, the login control section 54 of the server 30 rejects the player's login.

If the login is allowed, the function restricting section 55 of the server 30 refers to the account table 53 of FIG. 6, to check the function restricting flag and the function restricting information included in the account information of the player who successfully logged in in step S22 (S24).

Figure 11:
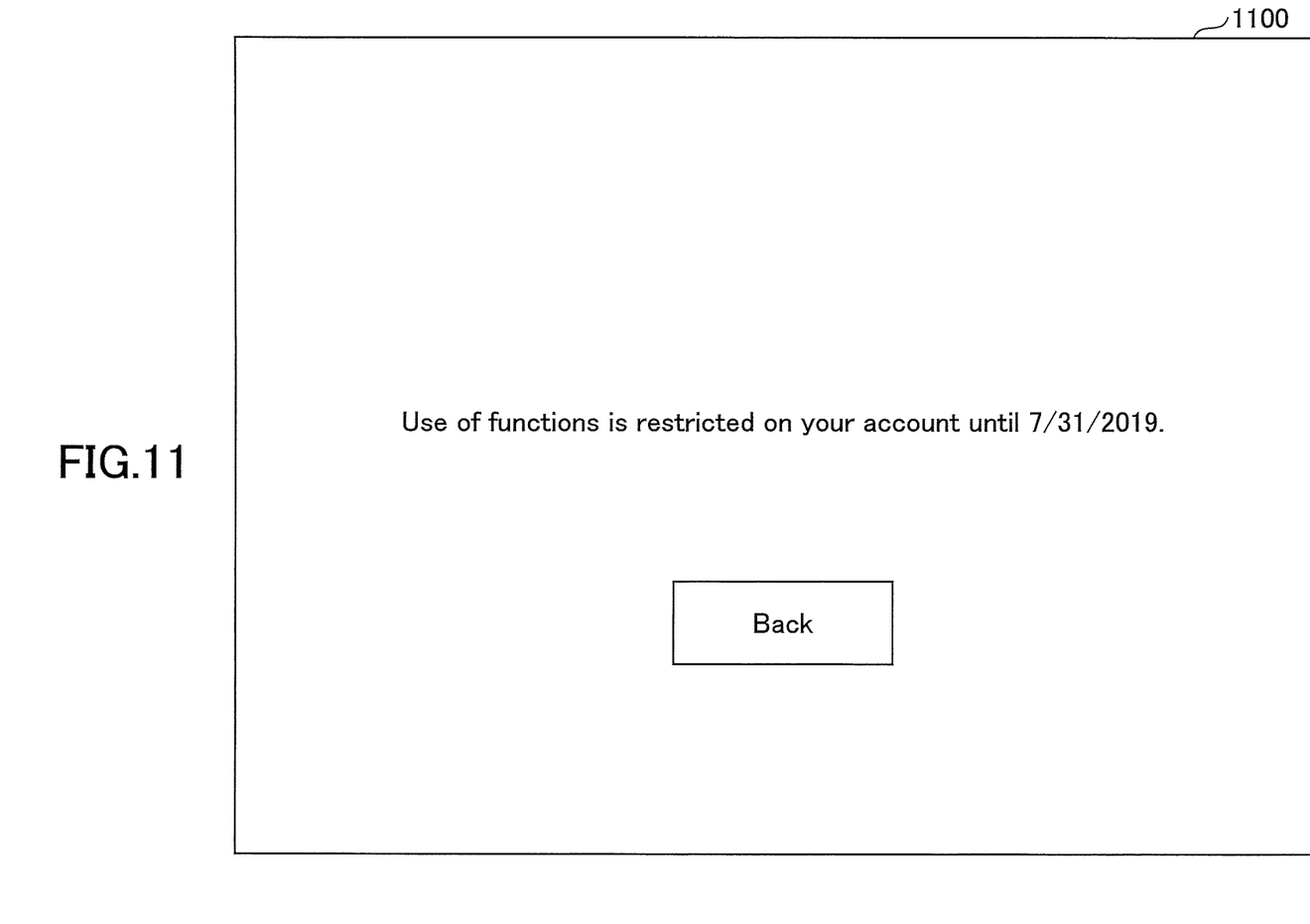
FIG. 11 is a diagram illustrating an example of an "under restriction" screen according to the embodiment.

When it is in a period of restricting use of the functions on the player's account (YES in S26), the function restricting section 55 displays an "under restriction" screen 1100 as illustrated in FIG. 11 on the client 20 operated by the player (S28). FIG. 11 is a diagram illustrating an example of the "under restriction" screen 1100 according to the present embodiment. The "under restriction" screen 1100 of FIG. 11 illustrates an example in which a message indicating that use of functions is restricted on the player's account and a period of the restriction of functions are displayed.

As described above, when use of functions on the player's account is under restriction, even if the player successfully logged in to the player's account, the "under restriction" screen 1100 is displayed, and the player cannot play the game. Meanwhile, when use of functions on the player's account is not under restriction (NO in S26), the function restricting section 55 determines whether or not it is the first time the restriction of the use of functions has expired, based on the function restricting flag and the function restriction information that have been checked in step S24 (S30). For example, in step S30, if the function restricting flag of the player is "on" (and current time is out of range of a period [expiration date] set in the function restriction information), the function restricting section 55 determines that it is the first time that the restriction of the use of functions has expired (determined YES in step S30).

If it is the first time that the restriction of the use of functions has expired (YES in S30), the function restricting section 55 updates the function restricting flag of the account table 53 of FIG. 6 from "on" to "off", and erases the period set in the function restriction information. In addition, the benefit granting section 56 of the server 30 performs the benefit granting process in which the player is granted benefit in the game (S32). A level of the benefit granted to the player varies depending on a period of time when use of functions has been restricted.

Thereafter, the game control section 57 of the server 30 causes the player to execute the game using the functions on the player's account (S34). If there is no function restriction that has expired at the current time (NO in S30), the function restricting section 55 skips step S32, and the game control section 57 causes the player to execute the game using the functions on the player's account (S34).

The benefit granted to the player in step S32 may be an item used in the game that compensates for at least a part of the period during which the player could not play the game, such as a time shortening item, an item for increasing acquired experience, or an item for raising a level for a certain period of time. Alternatively, the benefit granted to the player in step S32 may be a powerful weapon, a protective device, or a character that are useful for advantageously advancing in the game after the player returns to the game.

In addition, because benefit that attracts player's interest is expected to differ depending on an age of a player, a game rank of a player, or the like, the benefit granted to the player in step S32 may differ depending on the player's age, game rank, or the like even if a period of time when use of functions is restricted is the same. If the benefit given to the player in step S32 is attractive to the player, the player whose function restriction expires tends to return to the game.

According to the process of the flowchart illustrated in FIG. 10, the player can restrict his/her game play by setting a period by himself/herself. In addition, according to the process of the flowchart illustrated in FIG. 10, because benefit in the game is granted to the player whose restriction has expired, it is possible to prevent decrease of a continuation rate of the player's game play.

Figure 12:
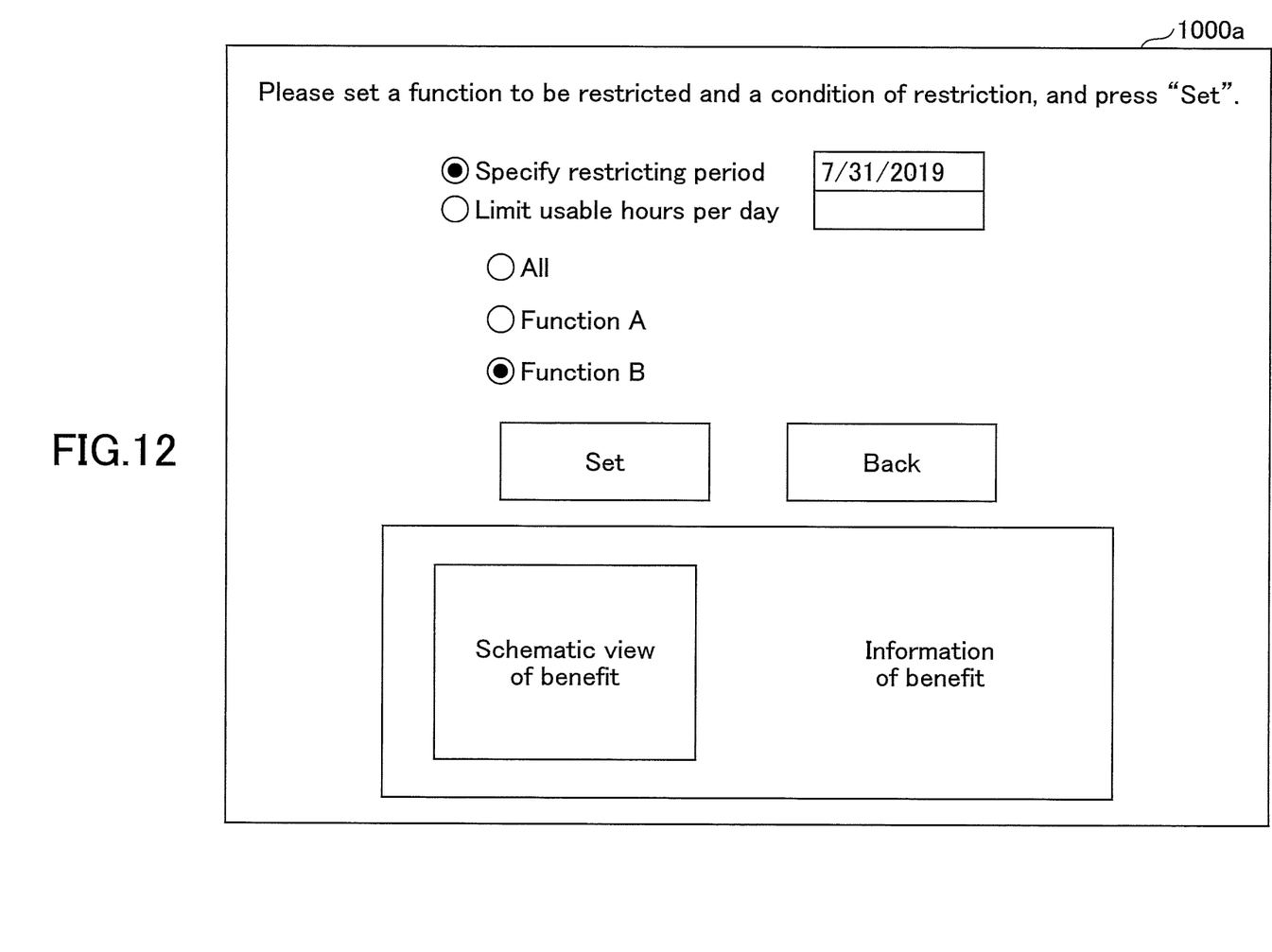
FIG. 12 is a diagram illustrating another example of the function restricting screen according to the embodiment.

In a case in which the account table 53 of FIG. 7 is used in the game system 10, in step S12, a function restricting screen 1000a in FIG. 12 is displayed on the client 20. FIG. 12 is a diagram illustrating an example of the function restricting screen 1000a according to the present embodiment. The function restricting screen 1000a of FIG. 12 is configured such that a user (player) can perform selection of a function to be restricted in use on the user's account, and perform a setting of a period of restricting use of the selected function.

The function restricting screen 1000a of FIG. 12 illustrates an example in which a function to be restricted in use is selected from among "All" (all functions), "Function A", and "Function B". Incidentally, when "All" is selected as the function to be restricted in use, the function restriction is the same as that of the function restricting screen 1000 illustrated in FIG. 9.

Figure 13:
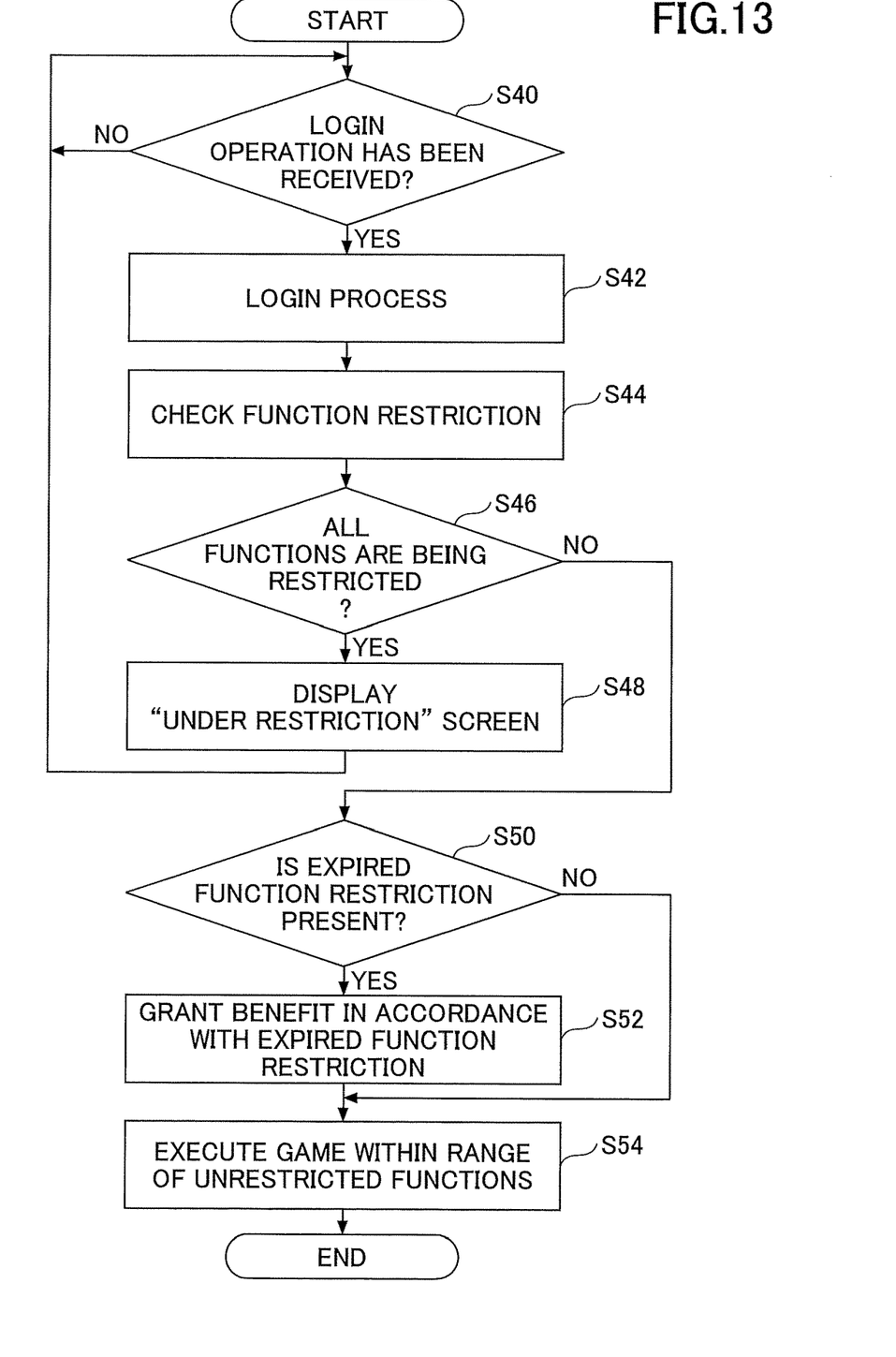
FIG. 13 is a flowchart illustrating another example of the login process of the game system according to the embodiment.

In the case in which the account table 53 of FIG. 7 is used, a process for the login operation of the game system 10 (such as the process described above with reference to FIG. 10) is as illustrated in FIG. 13. FIG. 13 is a flowchart illustrating another example of the process for the login operation of the game system 10 according to the present embodiment. Because the process of the flowchart illustrated in FIG. 13 is the same as that of the flowchart illustrated in FIG. 10 except for a part, the description will be omitted accordingly.

Processes in steps S40 to S42 are the same as those in steps S20 to S22 of FIG. 10. If the login is allowed as a result of performing step S42, the function restricting section 55 of the server 30 refers to the account table 53 of FIG. 7, to check the restricted function and the function restricting information included in the account information of the player who successfully logged in in step S42 (S44).

When all functions for the player's account are under restriction (YES in S46), the function restricting section 55 displays the "under restriction" screen 1100 as illustrated in FIG. 11 on the client 20 operated by the player (S48).

As described above, when use of all of the functions on the player's account is under restriction, even if the player successfully logged in to the player's account, the "under restriction" screen 1100 is displayed, and the player cannot play the game. Meanwhile, when use of all of the functions on the player's account is not under restriction (NO in S46), the function restricting section 55 determines if there is a function restriction that has expired at the current time, based on the restricted function and the function restriction information that have been checked in step S44 (S50).

If there is a function restriction that has expired at the current time (YES in S50), the function restricting section 55 erases the restricted function in the account table 53 of FIG. 7, and erases the period set in the function restriction information. In addition, the benefit granting section 56 of the server 30 performs the benefit granting process in which the player is granted benefit in the game (S52). A level of the granted benefit varies depending on a period of time when use of the function corresponding to the expired function restriction has been restricted.

Thereafter, the game control section 57 of the server 30 causes the player to execute the game within a range of functions which are not restricted in use on the player's account (S54). If there is no function restriction that has expired at the current time (NO in S50), the function restricting section 55 skips step S52, and the game control section 57 causes the player to execute the game within the range of the functions which are not restricted in use on the player's account (S54).

According to the process of the flowchart illustrated in FIG. 13, the player can restrict his/her game play by specifying a function to be restricted in use on the player's account and by specifying a period of the restriction. In addition, according to the process of the flowchart illustrated in FIG. 13, because benefit in the game is granted to the player whose restriction has expired, it is possible to prevent decrease of a continuation rate of the player's game play.

As described above, according to the present embodiment, a new mechanism that restricts a player's use of functions of a game or an SNS can be provided, while avoiding continuation rate decrease in use of the game or the SNS by the player.

OTHER EMBODIMENTS

The above-described embodiments have described the example in which the player himself/herself restricts use of a function on the player's account by specifying a period in order to restrict the player's own game play, and in which benefit in the game is granted upon expiration of the restriction. However, the present invention is not limited thereto. For example, if a player lets a person other than himself/herself (e.g. his/her friend, or his/her child) play a game after restricting use of apart of functions on the player's account by specifying a period of restriction, in order to introduce a game to the person, benefit may be granted in the game upon expiration of the period of the restriction.

In addition, in a case in which a player lets a person other than himself/herself play a game after restricting use of a part of functions on the player's account by specifying a period of restriction, in order to introduce a game to the person, if the person creates his/her user account, benefit may be granted to both the player and the person.

The game system 10, the client 20, and the server 30 in the above-disclosed embodiment should be considered exemplary and not limiting. The above embodiments may be modified and enhanced in various forms without departing from the appended claims and gist thereof. Additionally, matters described in the above described embodiments may take other configurations to an extent not inconsistent, and may be combined to an extent not inconsistent.

What is claimed is:

1. An information processing apparatus configured to cause a user having a user account to use functions on the user account, the information processing apparatus comprising:
   a processor; and
   a memory storing a computer program that causes the processor to execute a process including
      receiving an instruction from the user to restrict use of the functions on the user account;
      in response to the receiving of the instruction, restricting the use of the functions on the user account; and
      performing information processing for granting a benefit relating to the functions on the user account to the user, in accordance with a period of time when the use of the functions is restricted.

2. The information processing apparatus according to claim 1, wherein the instruction includes a period of time for restricting the use of the functions on the user account.

3. The information processing apparatus according to claim 2, wherein the information processing apparatus is configured such that, after receiving the instruction from the user, the user cannot cancel the restricting of the use of the functions.

4. The information processing apparatus according to claim 1, the process further including
   receiving an operation from the user to restrict use of a part of the functions on the user account; and
   in response to the receiving of the operation, restricting the use of the part of the functions on the user account.

5. The information processing apparatus according to claim 1, the process further including
   providing the user with information of the benefit relating to the functions on the user account that is granted to the user, at a time of starting the restriction of the use of the functions.

6. The information processing apparatus according to claim 1, wherein
   the functions on the user account relate to a game, and
   the benefit is an in-game benefit.

7. An information processing method performed on an information processing apparatus configured to cause a user having a user account to use functions on the user account, the method comprising:
   receiving an instruction from the user to restrict use of the functions on the user account;
   in response to the receiving of the instruction, restricting the use of the functions on the user account; and
   performing information processing for granting a benefit relating to the functions on the user account to the user, in accordance with a period of time when the use of the functions is restricted.

8. The information processing method according to claim 7, wherein
   the functions on the user account relate to a game, and
   the benefit is an in-game benefit.

9. A non-transitory computer-readable recording medium storing a computer program to cause a processor in an information processing apparatus to execute a method, the information processing apparatus being configured to cause a user having a user account to use functions on the user account, the method comprising:
   receiving an instruction from the user to restrict use of the functions on the user account;
   in response to the receiving of the instruction, restricting the use of the functions on the user account; and
   performing information processing for granting a benefit relating to the functions on the user account to the user, in accordance with a period of time when the use of the functions is restricted.

10. The non-transitory computer-readable recording medium according to claim 9, wherein
   the functions on the user account relate to a game, and
   the benefit is an in-game benefit.

* * * * *